United States Patent
Reuschenbach et al.

[19]

[11] Patent Number: 6,050,913
[45] Date of Patent: Apr. 18, 2000

[54] SYSTEM FOR ADJUSTING THE TENSION OF THE BELT DRIVE OF A BELT TRANSMISSION

[75] Inventors: Lutz Reuschenbach, Stuttgart; Karl-Heinz Senger, Löchgau; Joachim Luh, Bietigheim-Bissingen, all of Germany; Johan Luyckx, Bilzen, Belgium; Riné Pelders, Nuland, Netherlands

[73] Assignee: Robert Bosch GmbH, Stuttgart, Germany

[21] Appl. No.: 08/860,650

[22] PCT Filed: Dec. 23, 1995

[86] PCT No.: PCT/DE95/01856

§ 371 Date: Jun. 30, 1997

§ 102(e) Date: Jun. 30, 1997

[87] PCT Pub. No.: WO96/20364

PCT Pub. Date: Jul. 4, 1996

[30] Foreign Application Priority Data

Dec. 28, 1994 [DE]  Germany ............................. 44 47 034

[51] Int. Cl.[7] ......................................................... F16H 9/00
[52] U.S. Cl. ............................... 474/69; 474/28; 477/101
[58] Field of Search .................................. 474/18, 28, 69; 123/704; 477/101

[56] References Cited

U.S. PATENT DOCUMENTS

| | | |
|---|---|---|
| 4,736,301 | 4/1988 | Osanai . |
| 5,157,992 | 10/1992 | Hayashi et al. ...................... 474/28 X |
| 5,203,233 | 4/1993 | Hattori et al. ........................ 474/28 X |
| 5,243,881 | 9/1993 | Hayashi . |
| 5,937,729 | 8/1999 | Spiess et al. .......................... 474/28 X |
| 5,941,787 | 8/1999 | Imaida et al. ............................ 474/18 |

FOREIGN PATENT DOCUMENTS

| | | |
|---|---|---|
| 0451887 | 10/1991 | European Pat. Off. . |
| 0510590 | 10/1992 | European Pat. Off. . |
| 3812673 | 11/1988 | Germany . |
| 4239711 | 6/1994 | Germany . |
| 01136837 | 5/1989 | Japan . |

OTHER PUBLICATIONS

Patent Abstracts of Japan, vol. 13, No. 385 (M–864), Aug. 1989.

*Primary Examiner*—Donald P. Walsh
*Assistant Examiner*—Emmanuel M. Marcelo
*Attorney, Agent, or Firm*—Walter Ottesen

[57] ABSTRACT

A system for adjusting the tension of a belt of a belt transmission provides a higher accuracy of the estimate of the engine torque, which is to be expected, and therefore a better proportioning of the tension is obtained. For this purpose, signals are made available from the engine control which controls the internal combustion engine. These signals make possible a precise estimation of the engine torque. In a first embodiment, this signal can, for example, be an estimated value for the engine torque to be expected. The estimated value is, for example, formed in the engine control. In a second embodiment, these signals can be the quantity of air mass inducted by the engine (that is, the signal derived therefrom) and the ignition angle of the engine. The tension of the belt can be reduced by the more accurate estimate of the engine torque so that an improved transmission efficiency results.

14 Claims, 8 Drawing Sheets

PRIOR ART

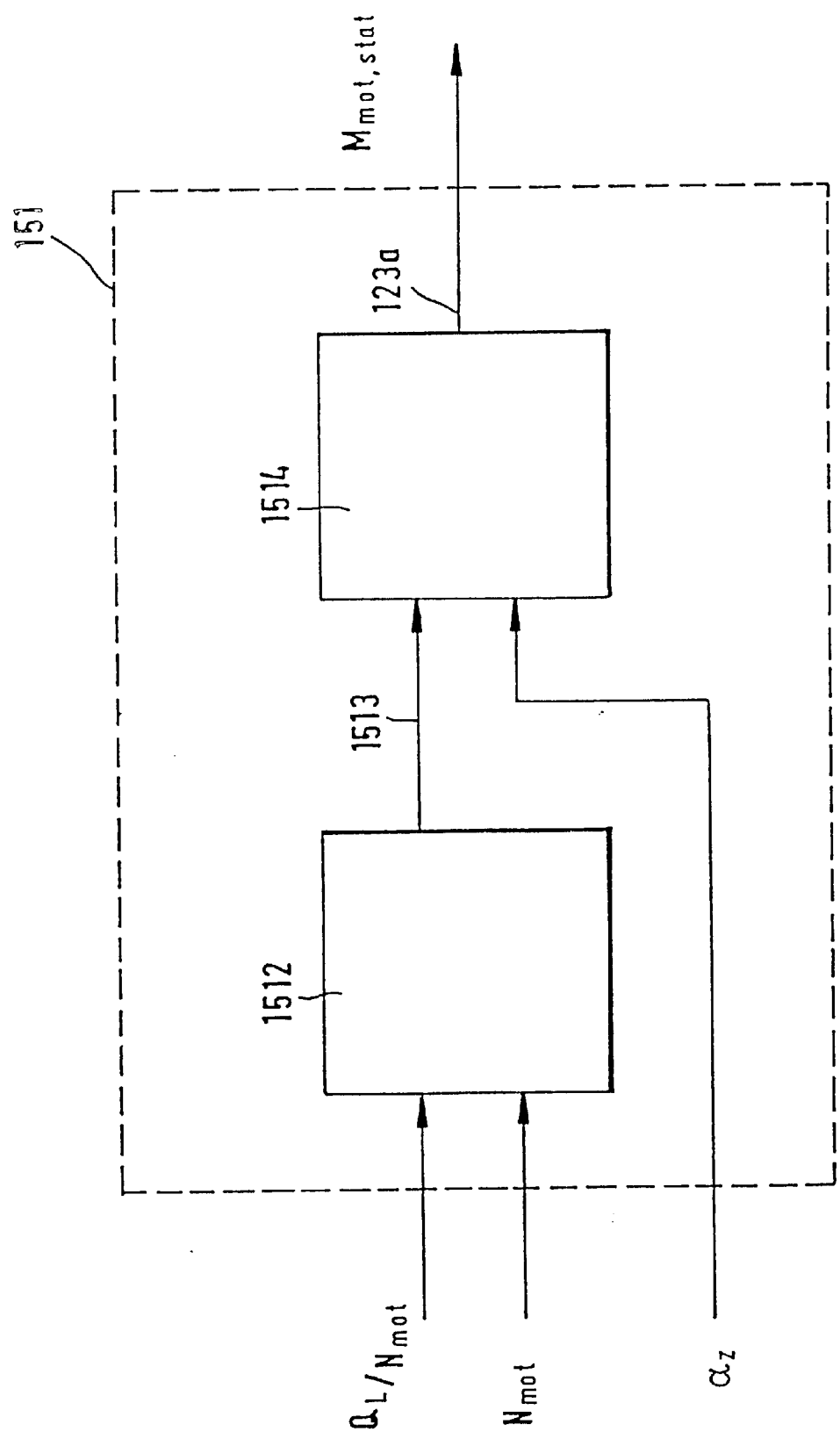

SYSTEM FOR ADJUSTING THE TENSION OF THE BELT DRIVE OF A BELT TRANSMISSION

BACKGROUND OF THE INVENTION

Such a system is described in FIG. 1 and is known, for example, from EP-A-0 451 887. This publication too relates to the adjustment of the tension of a belt means 1, usually a belt, in a continuous belt transmission 2 comprising belt means 1, a drive pulley 3 and an output pulley 4 which is driven by an engine 11.

To adjust the transmission ratio of a continuously variable belt transmission and the tension of the belt means 1, the drive pulley 3 comprises an axially stationary conical pulley 7 and an axially moveable conical pulley 9 and the output pulley 4 comprises an axially stationary conical pulley 8 and an axially moveable conical pulley 10. The drive pulley 3 is also known as the primary pulley and the output pulley 4 is also known as the secondary pulley. Pressing of the axially moveable conical pulley halves 9 and 10 against the belt means 1 takes place in response to the build-up of a hydraulic pressure in the respective oil chambers 5 and 6. The desired transmission ratio of the continuously variable belt transmission and the required tension of the belt means 1 can be adjusted by a suitable selection of the applied pressures $P_{prim}$ and $P_{sec}$ in the oil chambers 5 and 6. For the force transmission from the engine 11 to the drive pulley 3, a torque converter 12 and a planetary assembly 13 can, for example, be provided with clutches for forward and rearward travel. The engine 11 can also drive the pump 14 of the continuously variable belt transmission. A transmission control 18 comprises the electrical and hydraulic components for driving the continuously variable belt transmission. The transmission control 18 includes means for adjusting the pressure in the oil chamber 6 or in the oil chambers 5 and 6.

The tension of the belt means 1 is adjusted in one embodiment of the transmission control 18 utilizing the pressure $P_{sec}$ in the output end oil chamber 6.

The tension of the transmission means 1 is so adjusted that the efficiency of the continuously variable belt transmission is a maximum. On the one hand, it is to be prevented that the belt means 1 suddenly slips because of too low a tension and, on the other hand, the tension of the belt means 1 must not be too high in order to avoid high losses in the continuously variable belt transmission. To reconcile the two requirements, the torque transmitted from the drive pulley 3 to the output pulley 4 must be known as precisely as possible. The torque to be transmitted on the drive pulley 3 is determined primarily by the torque of the engine 11 and the torque amplification factor of the torque converter 12.

In EP-A-0 451 887, a method for adjusting the pressure $P_{sec}$ in the output end oil chamber 6 is described. In this method, the rotational angle $\alpha_{Dk}$ of the throttle flap 15 of the engine 11 is detected by a sensor 16. Furthermore, the rpm $N_{mot}$ of the engine 11, the rpm $N_{prim}$ of the primary pulley 3 and the rpm $N_{sec}$ of the secondary pulley 4 are measured with rpm sensors 19, 20 and 21 and conducted as corresponding signals to the transmission control 18. The angle position $\alpha_{Dk}$ of the throttle flap is measured by the sensor 16. The angle position $\alpha_{Dk}$, the engine rpm $N_{mot}$, the primary rpm $N_{prim}$, and the secondary rpm $N_{sec}$ are utilized in the transmission control 18 to adjust the tension of the belt means 1 by adjusting the pressure in the oil chamber 6.

To adjust the tension of the belt means 1, the engine torque to be expected is estimated with a characteristic field of the throttle flap angle and the engine rpm. The engine torque to be expected is converted into an expected primary torque in a characteristic field with the formed quotient of the primary rpm and the engine rpm. Thereafter, the computation of the required pressure $P_{sec}$ takes place in the output end oil chamber to adjust the tension of the belt element 1.

The use of the throttle flap angle $\alpha_{Dk}$ to estimate the torque has the disadvantage that the calibration of the throttle flap potentiometer must take place very precisely. Even a small deviation of the measured throttle flap angle from the actual throttle flap angle can, in the above method, lead to a considerable deviation between the expected engine torque and the actual engine torque. It is difficult to guarantee that the throttle flap angle will always be measured correctly. For this reason, the belt tension must be held above the required level with a high safety reserve in that a pressure higher around the reserve pressure is adjusted in the output end oil chamber. This leads to higher losses in the transmission and in the pump. Furthermore, problems can occur for the estimate of the engine torque during dynamic driving conditions with greater time-dependent changes of the engine rpm.

SUMMARY OF THE INVENTION

The object of the present invention is to optimize the adaptation of the belt tension to the actual engine torque.

As already mentioned, the invention proceeds from a system for adjusting the tension of a belt of a belt transmission which, preferably, can be adjusted continuously with respect to its transmission ratio. The tension is adjusted in dependence upon the operating parameters of the vehicle engine. The essence of the invention is that, as an operating parameter of the vehicle engine, a signal representing the engine torque is applied. This affords the advantage that the belt tension can be adapted better to the engine torque actually present than with the use of the throttle flap signal.

In an advantageous embodiment of the invention, it is provided that a signal representing the steady-state engine torque is applied as an operating parameter of the vehicle engine. Here, the engine torque to be expected is to be understood for an engine rpm which is essentially constant as a function of time. This configuration has the advantage that this quantity is relatively simple to determine and is generally present in an engine control apparatus.

It is especially advantageous that, as an operating parameter of the engine of the vehicle, a signal is applied which represents the dynamic engine torque. In this way, an optimal adaptation of the belt tension is achieved even during very dynamic driving conditions in which the engine rpm varies greatly as a function of time.

To achieve the dynamic engine torque, a signal is detected which represents the rpm of the engine of the vehicle and the signal, which represents the dynamic engine torque, is determined while considering the time-dependent change of the signal representing the rpm of the engine of the vehicle. Furthermore, and to determine the signal representing the dynamic engine torque, a variable is considered which represents the inertia of the engine of the vehicle.

In general, a first means (engine control apparatus) for controlling the vehicle engine and a second means (transmission control apparatus) for controlling the belt transmission are provided. It is especially advantageous that the signal, which represents the engine torque, is formed in the first means and is supplied to the second means for adjusting the tension. A quantity representing the engine torque is generally present in the engine control apparatus.

For this reason, this embodiment affords the advantage that this quantity can be supplied to the transmission control apparatus via a torque interface (for example, via a known bus system).

As an alternative to the above, a first signal can be supplied from the first means (engine control) to the second means (transmission control) with this first signal representing the air mass or air quantity supplied to the engine of the vehicle. The signal, which represents the engine torque, can then be derived from this first signal. Furthermore, and in addition to the first signal (air mass or air quantity), a second signal can be supplied from the first means (engine control) to the second means (transmission control) with this signal representing the ignition angle or the ignition time point of the engine of the vehicle. The signal representing the engine torque for adjusting the tension can then be derived from the first and second signals.

The above-mentioned embodiments are directed to determination of the actual engine torque to be expected in spark ignition engines. On the other hand, in diesel engines, a first signal can be supplied from the engine control apparatus to the transmission control apparatus which represents the fuel quantity supplied to the vehicle engine. The signal, which represents the engine torque for adjusting the voltage, is then derived from this first signal. Furthermore, a second signal is supplied from the engine control apparatus to the transmission control apparatus which represents the time point at which the fuel is injected. The signal, which represents the engine torque, for adjusting the tension is then derived from the first and second signals.

The tension of the belt is provided by a charge of pressure of at least one pressure chamber.

In summary, the invention comprises a method for adjusting the tension of the belt means wherein a higher precision of the estimate of the engine torque to be expected and therefore a better metering of tension is achieved. For this purpose, signals are made available from the engine control which controls the internal combustion engine. These signals make possible a precise estimate of the engine torque. In a first embodiment, this signal can, for example, be an estimated value formed in the engine control for the engine torque to be expected. In a second embodiment, these signals can be the quantity of the air mass inducted by the engine (or the fuel quantity supplied to the engine) or a signal derived therefrom and the ignition angle of the engine (or the injection time point). The tension of the belt means can be reduced via the precise estimate of the engine rpm so that an improved transmission efficiency results.

BRIEF DESCRIPTION OF THE DRAWINGS

FIG. 5a is a detail view of block 151 of FIG. 4b;

DESCRIPTION OF THE PREFERRED EMBODIMENTS OF THE INVENTION

The invention will be explained in the following on the basis of different embodiments.

Figure 1:
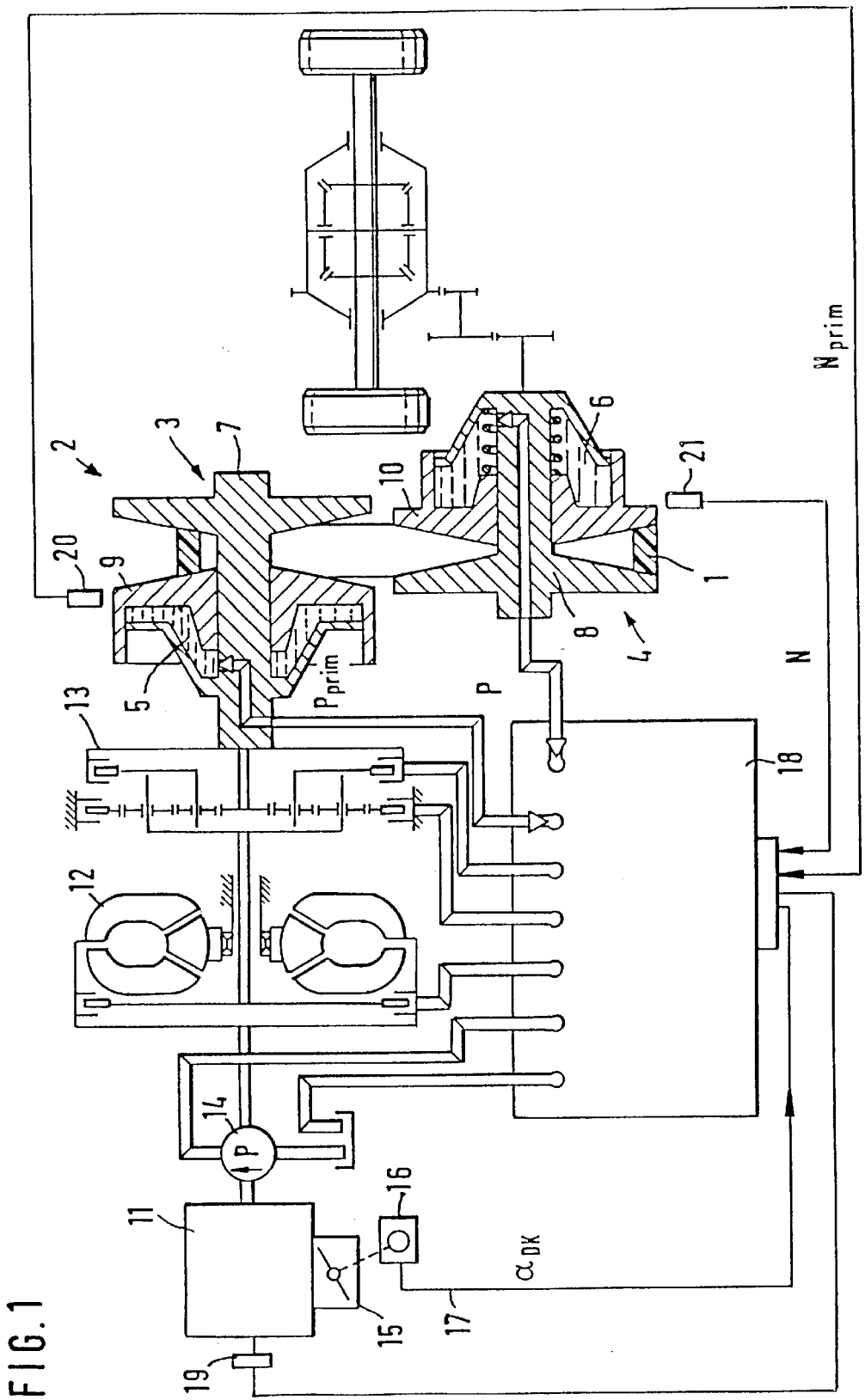
FIG. 1 is a schematic of a system for adjusting the tension of a belt in a belt transmission known per se.
Figure 2:
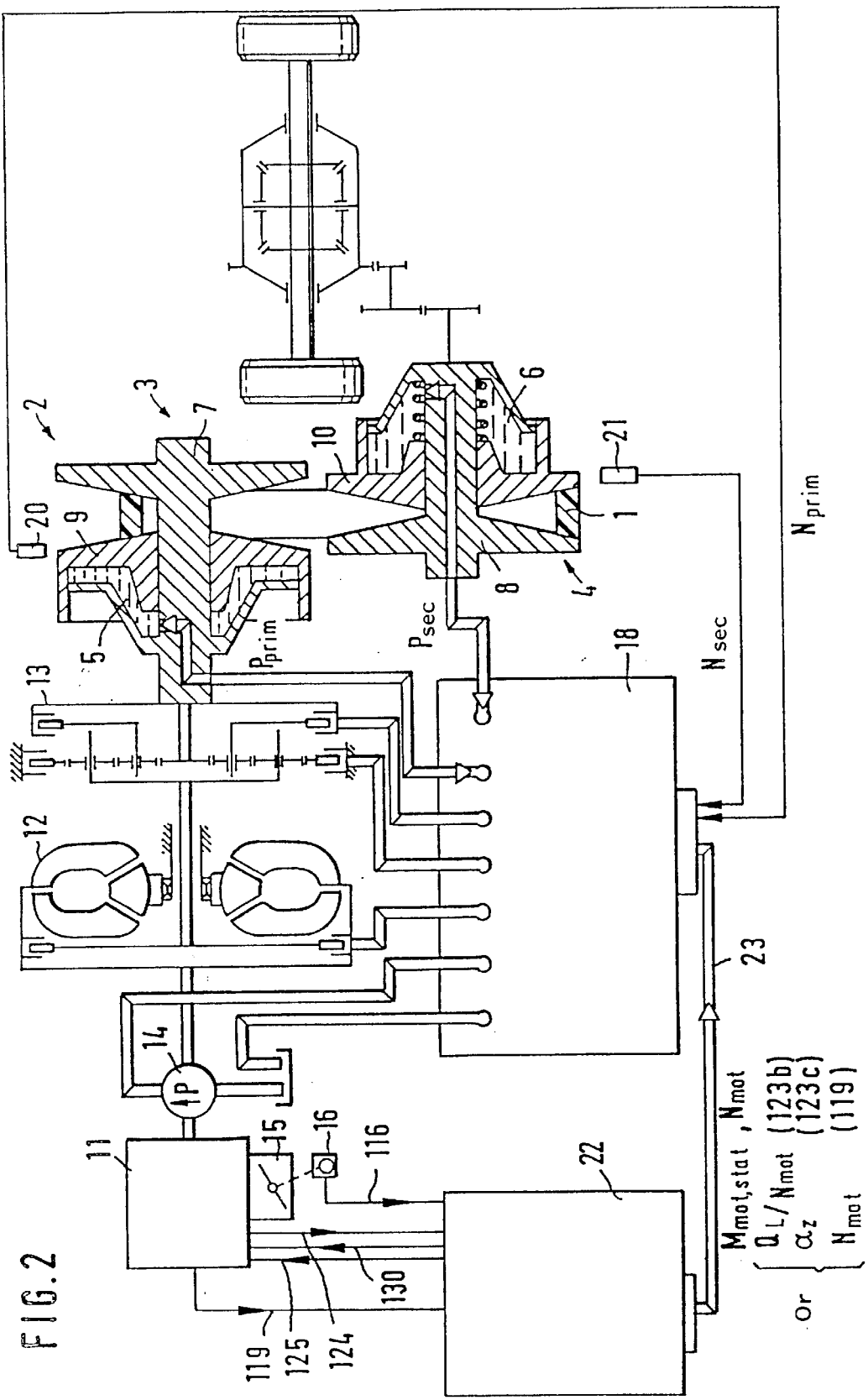
FIG. 2 is a schematic of a belt transmission and a system for controlling the tension of the belt thereof according to an embodiment of the invention.

For this purpose, FIG. 2 shows an overview block circuit diagram wherein the blocks described in FIG. 1 are identified with the same reference characters.

FIG. 2 shows a continuously variable belt transmission having the transmission control 18 which is connected via the connection 23 to the engine control 22 which controls the internal combustion engine 11. In contrast to FIG. 1, a coupling 23 of engine control 22 and transmission control 18 permits one or more signals of the engine control 22 to be transmitted to the transmission control 18.

To control the engine 11, the engine control 22 receives various signals as to the operating state of the engine via the connections 116, 119 and 124. Actuators of the engine are driven via the connections 125 and 130. This will be explained in further detail with respect to FIG. 3.

Figure 3:
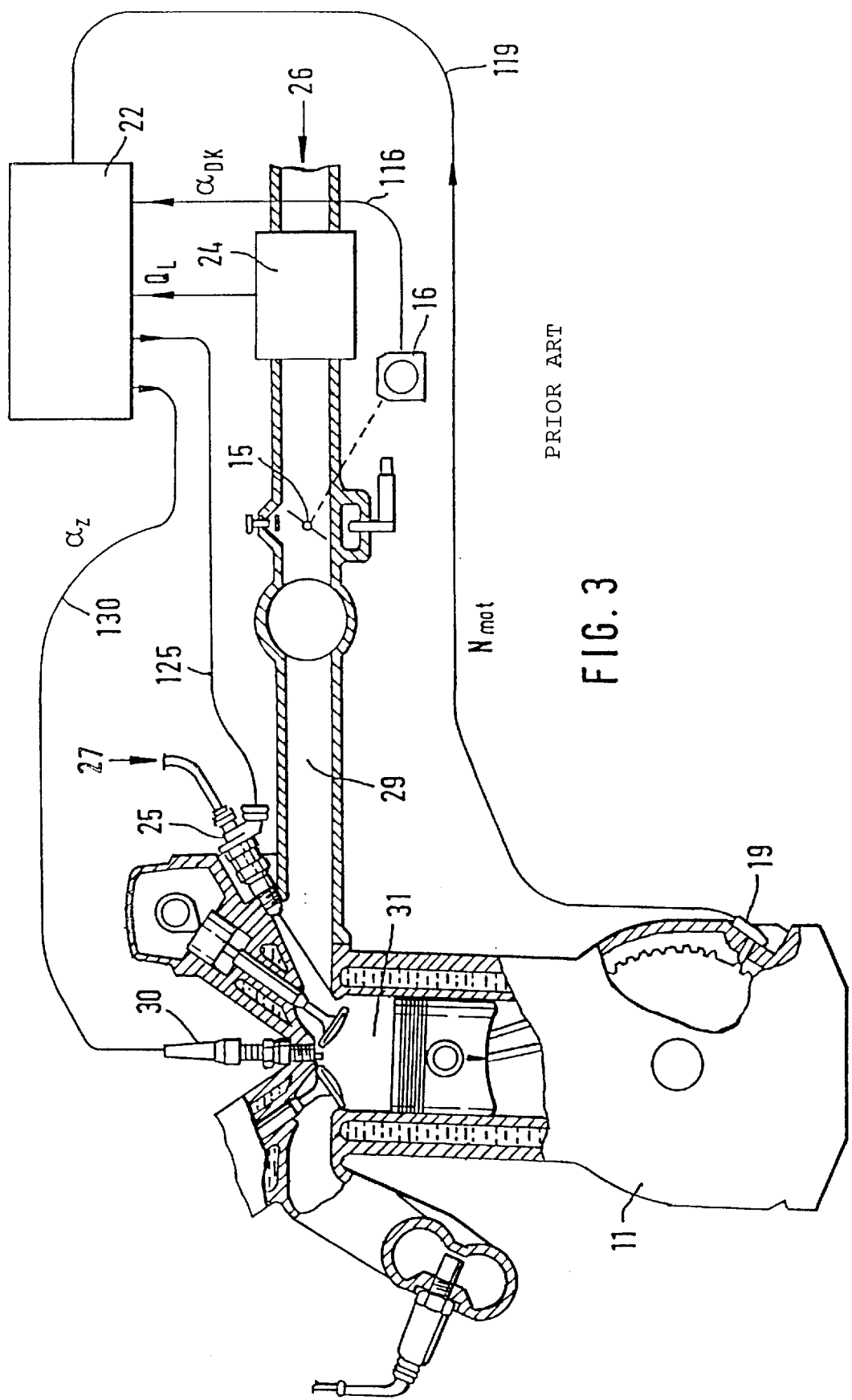
FIG. 3 is a schematic showing how signals are detected such as engine speed and inducted air mass as well as a control for the engine also as known per se.

FIG. 3 shows a possible embodiment of the detection of signals 119, 124 and 116 and the drive of the engine 11 with the signals 125 and 130. A cylinder of the engine 11 is shown. The signal 119 is the rpm $N_{mot}$ of the engine and is measured by the rpm sensor 19. The mass $Q_L$ of the air 26, which is inducted into the intake pipe 29, is measured by a sensor 24 (air mass sensor). The air mass $Q_L$ is conducted as signal 124 to the engine control 22. The engine control 22 actuates a device 25 for metering fuel 27 via the signal 125. The fuel 27 can, for example, be injected into the intake pipe 29. The device 25 can, for example, be a fuel injection valve. Furthermore, the drive $\alpha_z$ of the spark plugs 30 takes place by the engine control 22 for the ignition of the air/fuel mixture in the interior of the combustion chamber 31 of the engine 11.

The engine control 22 supplies, inter alia, signals 125 and 130 for driving the engine 11 and these signals are, inter alia, dependent upon the signal 124 which represents the mass of the air inducted by the engine 11. The engine rpm $N_{mot}$ and the angle position $\alpha_{Dk}$ of the throttle flap are supplied to the engine control 22 as signals 119 and 116, respectively.

In a first embodiment of the invention, the engine control 22 determines the engine torque $M_{mot,stat}$, which is to be expected, and transmits the result as signal 123a via the connection 23 to the transmission control 18. Methods for computing the torque, which is to be expected, from the signals (119, $N_{mot}$), (124, inducted air $Q_L$), (116, $\alpha_{Dk}$), (125, injection quantity), and (130, ignition time point $\alpha_z$) correspond to the state of the art disclosed in DE-OS 42 39 711. Furthermore, the engine rpm $N_{mot}$ is supplied to the transmission control 18.

In a second embodiment of the invention, the engine control transmits a load signal (123b, $Q_L/N_{mot}$) to the transmission control 18. The load signal (123b, $Q_L/N_{mot}$) is formed from the signal (124, inducted air $Q_L$) and the engine rpm signal $N_{mot}$ (119) by dividing (124, $Q_L$) by (119, $N_{mot}$). Furthermore, the ignition time point $\alpha_z$ is transmitted as signal 123c by the engine control 22 to the transmission control 18 via the connection 23.

In both embodiments, the engine rpm (119, $N_{mot}$) and the angle position (116, $\alpha_{Dk}$) of the throttle flap 15 can be transmitted via the connection 23 from the engine control 22 to the transmission control 18.

Figure 4A:
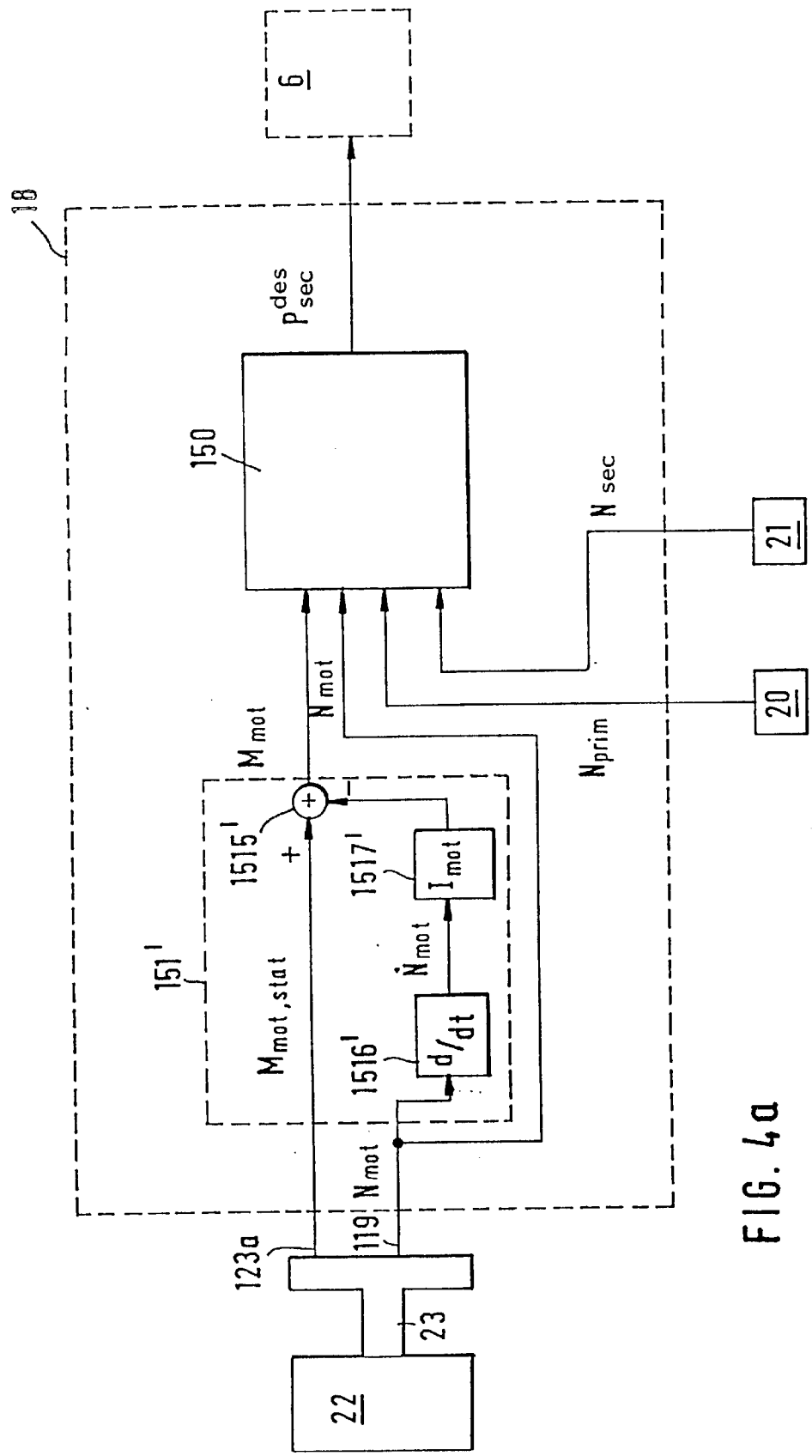
FIG. 4a is a block diagram of a portion of the transmission control according to another embodiment of the invention.

FIG. 4a shows the portion of the transmission control 18 which is relevant for the second embodiment of the invention. As already mentioned, the steady-state engine torque $M_{mot,stat}$, which is to be expected, is transmitted as signal 123a and the engine rpm $N_{mot}$ is transmitted as signal 119 from the engine control 22 via the connection 23 to the transmission control 18. The steady-state engine torque $M_{mot,stat}$ is supplied either to the block 151' or directly to the block 150 while bypassing the block 151' shown in FIG. 4a.

In the following, the variation wherein the block 151' is provided will be described. In this variation, it is considered that the engine torque $M_{mot,stat}$, which is formed in the engine control 22, corresponds to the instantaneous steady-state engine torque wherein the engine rpm is essentially constant as a function of time. To obtain the "dynamic" engine torque, the engine rpm $N_{mot}$ is first differentiated as a function of time in block 1516' to the time-dependent change $\dot{N}_{mot}$ of the engine rpm, the engine rpm gradient. In block 1517', the inertia of the engine 11 is considered. This can, for example, be provided in that the engine rpm gradient $\dot{N}_{mot}$ is multiplied by an inertia value $I_{mot}$ which is typical for the particular engine 11. The quantity $(\dot{N}_{mot} * I_{mot})$ is superposed on the steady-state engine torque $M_{mot,stat}$ in block 1515' to form the engine torque $M_{mot}$.

The engine torque $M_{mot}$ (or, depending upon the variation, the steady-state engine torque $M_{mot,stat}$) is supplied to block 150. In block 150, the desired pressure $P_{sec}^{des}$ for the secondary end (oil chamber 6) is formed in dependence upon the steady-state engine torque $M_{mot}$ ($M_{mot,stat}$), the primary rpm $N_{prim}$ (rpm sensor 20) and the secondary rpm $N_{sec}$ (rpm sensor 21). The adjustment of the desired output-end oil pressure can take place with electrical and hydraulic means, for example, in accordance with the initially-mentioned EP-A-0 451 887.

Figure 4B:
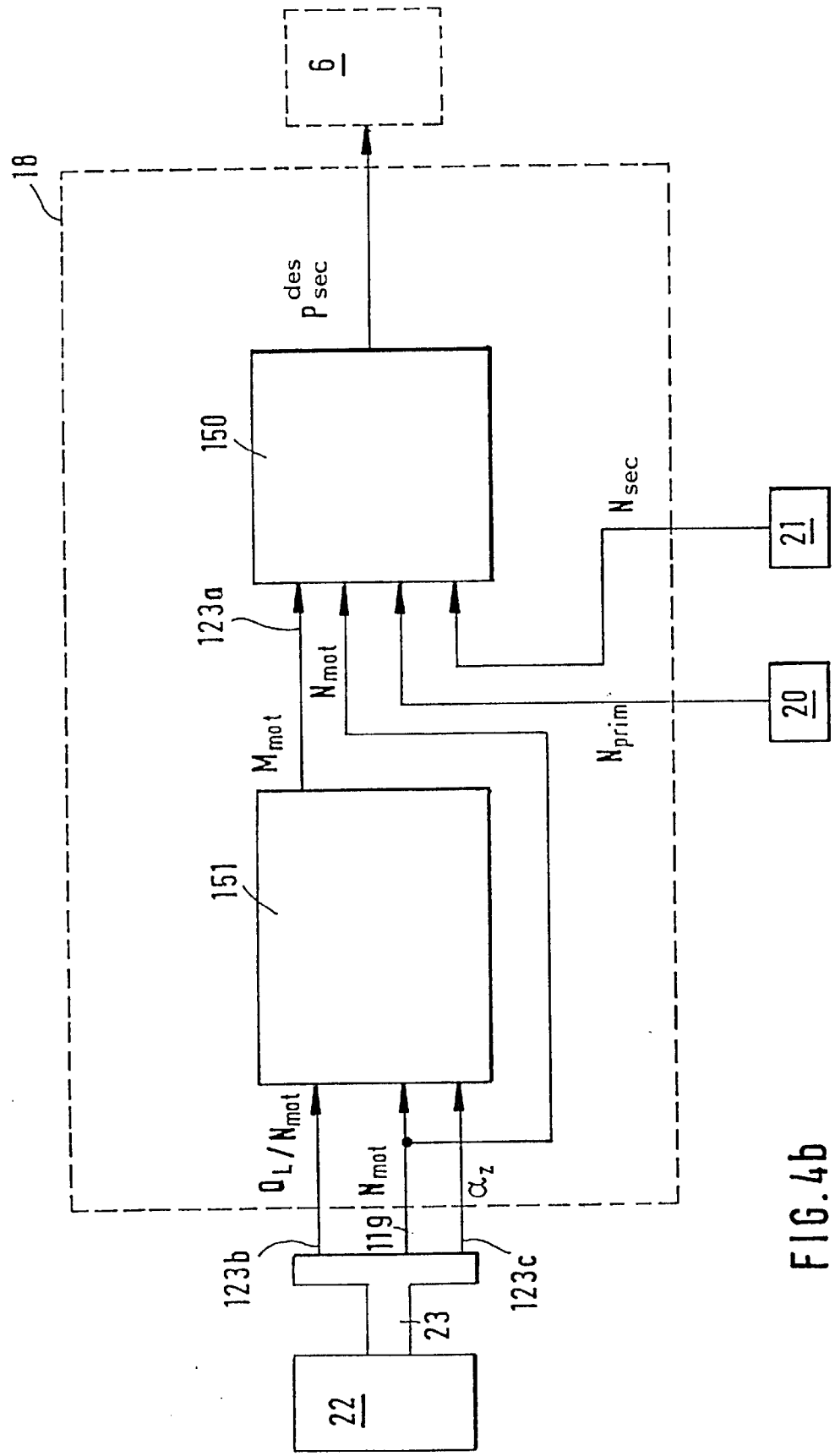
FIG. 4b is a circuit block diagram of a portion of the transmission control according to another embodiment of the invention.

FIG. 4b shows the portion of the transmission control 18 which is relevant for the second embodiment of the invention. As already mentioned, the load signal (123b, $Q_L/N_{mot}$), the ignition time point $\alpha_z$ as signal 123c and the instantaneous engine rpm (signal 119, $N_{mot}$) are supplied from the engine control 22 to the transmission control 18 via the connection 23. In dependence upon the signals, and depending upon the embodiment, the steady-state engine torque $M_{mot,stat}$ or the dynamic engine torque $M_{mot}$ are formed in block 151 as signal 123a and supplied to block 150. In block 150, the desired pressure $P_{sec}^{des}$ is formed for the secondary end (oil chamber 6) in dependence upon the steady-state engine torque $M_{mot,stat}$, the primary rpm $N_{prim}$ (rpm sensor 20) and the secondary rpm $N_{sec}$ (rpm sensor 21). The adjustment of the desired output-end oil pressure takes place with electrical and hydraulic means in accordance, for example, with the initially-mentioned EP-A-0 451 887.

The configuration of block 151 is described with respect with FIG. 5a. For this purpose, FIG. 5 shows the block (torque computation 1512) for computing the engine torque ($M_{mot,stat}$, signal 123a) which is to be expected. The block 1512 contains a characteristic field computation and with block 1512, the signal 1513 is computed from the load signal ($Q_L/N_{mot}$, signal 123b) and the engine rpm ($N_{mot}$, signal 119). In a second block 1514, the engine torque ($M_{mot,stat}$, signal 123a), which is to be expected, is computed from the signal 1513 and the ignition time point ($\alpha_z$, signal 123$_c$).

Figure 5B:
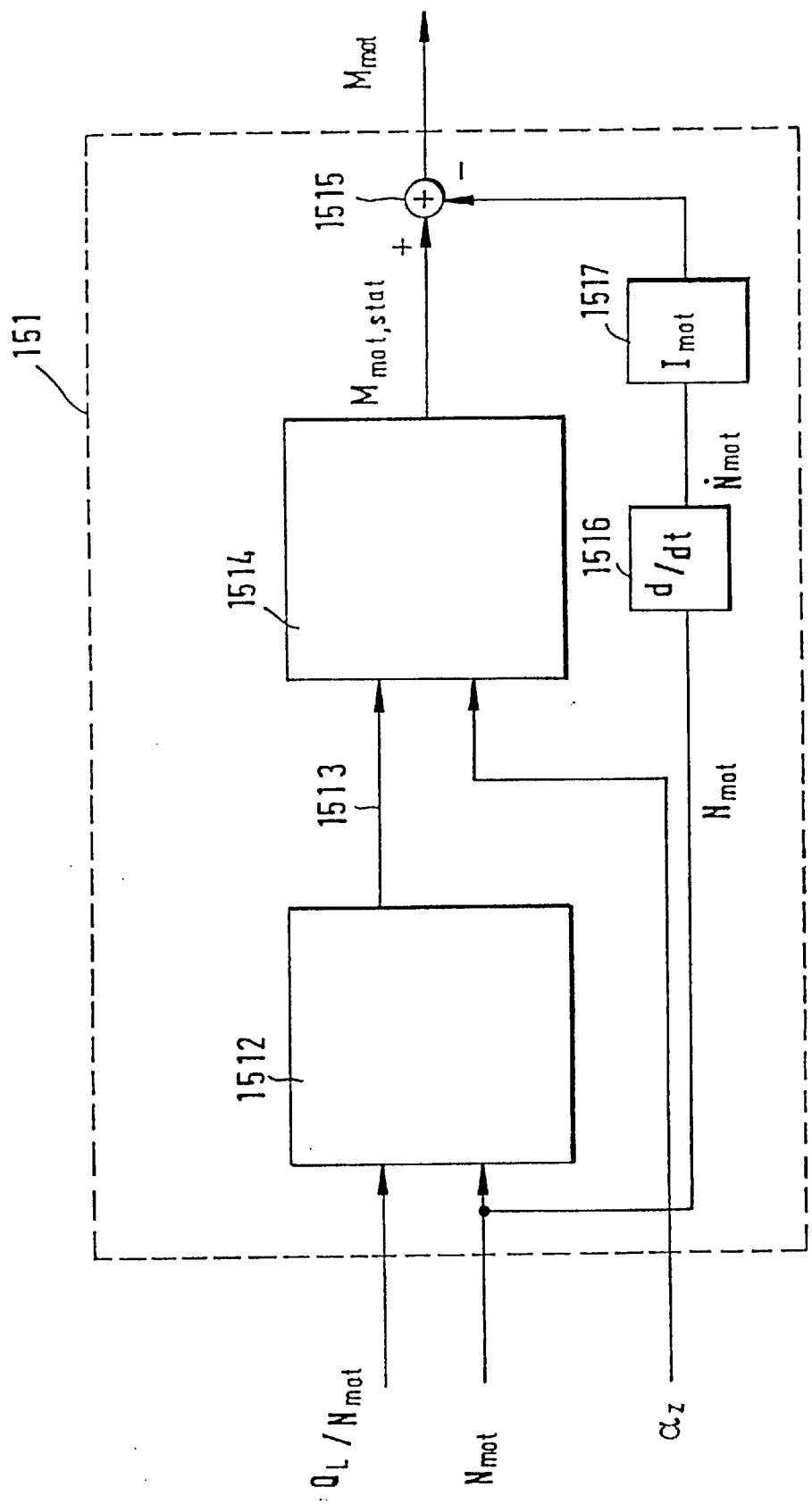
FIG. 5b is a detail view of block 151 according to another embodiment of the invention; and, FIG. 6 is a detail view of block 150.

An embodiment of block 151 is shown in FIG. 5b. In this variation, it is considered that the engine torque $M_{mot,stat}$, which is formed in blocks 1512 and 1514, corresponds to the instantaneous steady-state engine torque, that is, the engine torque when the instantaneous engine rpm is held constant.

In order to obtain the dynamic engine torque, the engine rpm $N_{mot}$ is differentiated in block 1516 as a function of time to form the time-dependent change $\dot{N}_{mot}$ of the engine rpm, namely, the engine rpm gradient. The inertia of the engine 11 is considered in block 1517. This can, for example, take place in that the engine rpm gradient $\dot{N}_{mot}$ is multiplied by an inertia value $I_{mot}$ typical for the particular engine 11. The quantity $(\dot{N}_{mot} * I_{mot})$ which is so obtained is superposed on the steady-state engine torque $M_{mot,stat}$ in block 1515 to form the engine torque $M_{mot}$.

Figure 6:
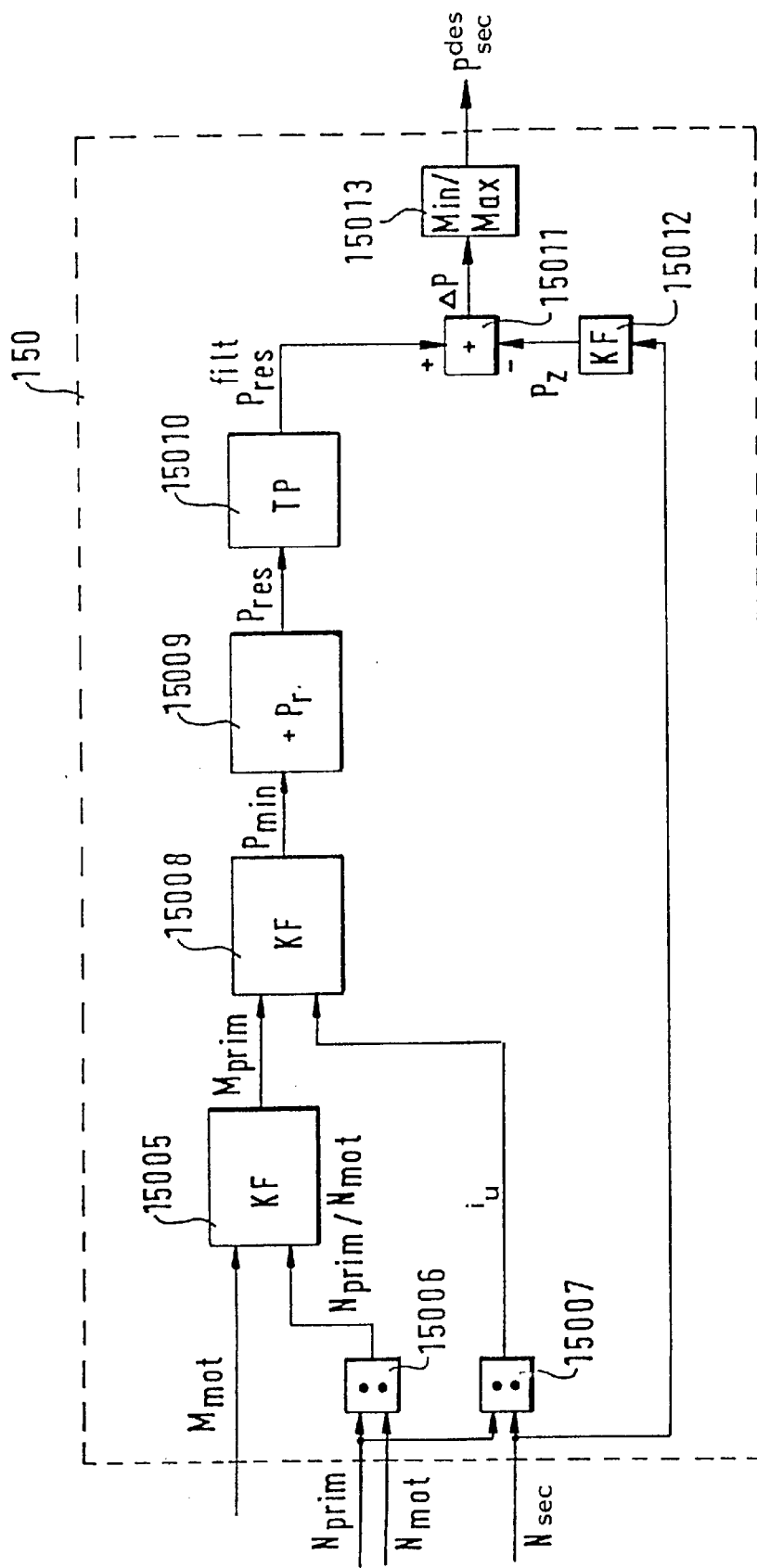

The detailed configuration of block (150, belt tension controller) is described with respect to FIG. 6. For this purpose, FIG. 6 shows a block circuit diagram for computing the required pressure $P_{sec}^{des}$ in the oil chamber 6 to adjust the tension of the belt means 1 in the first and second embodiments of the invention.

The signal $N_{prim}/N_{mot}$ is formed with block 15006 as a quotient of the primary rpm $N_{prim}$ and the engine rpm $N_{mot}$. The signal $N_{prim}/N_{mot}$ and the expected engine torque $M_{mot}$ is converted in the block 15005 by means of a characteristic field computation into the expected primary torque $M_{prim}$. In block 15007, the rpm transmission ratio $i_u$ of the continuously variable belt transmission is computed as the quotient of the primary rpm $N_{prim}$ and the secondary rpm $N_{sec}$ to form $i_u = N_{prim}/N_{sec}$. In the block 15008, a minimum desired pressure $P_{min}$ is computed with a characteristic field from the primary torque $N_{prim}$, which is to be expected, and the rpm transmission ratio $i_u$. A reserve pressure $P_r$ is added to the minimum desired pressure $P_{min}$ in block 15009. The resulting signal $P_{res}$ is filtered in the block 15010 by a special lowpass. However, the filter acts only when the signal $P_{res}$ becomes smaller. If the signal $P_{res}$ is greater, then the output signal $P_{res}^{filt}$ of the lowpass filter 15010 follows the signal $P_{res}$ directly.

In block 15012, a centrifugal pressure $P_z$ is computed from the secondary rpm $N_{sec}$ with a characteristic field. This centrifugal pressure $P_Z$ is subtracted from the signal $P_{res}^{filt}$ in block 15011. The difference $\Delta P$ is limited in the block 15013 to minimum and maximum values. As a result, the required pressure in the oil chamber 6 is obtained with the signal $P_{sec}^{des}$.

We claim:

1. A system for adjusting the tension of a belt of a belt transmission, the belt transmission being mounted downstream of a vehicle engine to which a quantity of air is supplied during operation thereof, the system comprising:

first control means for controlling said engine;

second control means for controlling said transmission;

said first control means including means for supplying a first signal ($Q_L$) to said second control means; said first signal ($Q_L$) representing the air quantity supplied to said engine;

said second control means including ancillary means for deriving a torque signal ($M_{mot,stat}$, $M_{mot}$), which represents engine torque, from said first signal ($Q_L$) for adjusting the tension of said belts;

said first control means including means for supplying a second signal ($\alpha_Z$) to said second control means; said second signal ($\alpha_Z$) representing the ignition angle or ignition time point of said engine; and, said ancillary means being adapted to derive said torque signal ($M_{mot,stat}$, $M_{mot}$) for adjusting said tension from said first and second signals.

2. The system of claim 1, wherein said belt transmission is a continuously variable belt transmission.

3. The system of claim 1, wherein a signal ($M_{mot,stat}$), which represents the steady-state engine torque, is applied to adjust said tension.

4. The system of claim 1, wherein a signal ($M_{mot}$) is applied for adjusting said tension; and, said signal ($M_{mot}$) representing the dynamic engine torque.

5. The system of claim 4, further comprising:

means for detecting a signal ($N_{mot}$) representing the rpm of said engine; and, means for determining the time-dependent change ($\dot{N}_{mot}$) of said signal ($N_{mot}$) representing the rpm of said engine for determining said engine torque.

6. The system of claim 5, wherein a quantity ($I_{mot}$) represents the inertia of said engine; and, said quantity ($I_{mot}$) is applied to determine said engine torque.

7. The system of claim 1, wherein said tension is provided by charging at least one pressure chamber with pressure.

8. A system for adjusting the tension of a belt of a belt transmission, the belt transmission being mounted downstream of a vehicle engine to which a quantity of fuel is supplied during operation thereof, the system comprising:

first control means for controlling said engine;

second control means for controlling said transmission;

said first control means including means for supplying a first signal to said second control means; said first signal representing the fuel quantity supplied to said engine;

said second control means including ancillary means for deriving a torque signal, which represents engine torque, from said first signal for adjusting the tension of said belts;

said first control means including means for supplying a second signal to said second control means, said second signal representing the time point at which the fuel is injected; and, said ancillary means being adapted to derive said torque signal for adjusting said tension from said first and second signals.

9. The system of claim 8, wherein said belt transmission is a continuously variable belt transmission.

10. The system of claim 8, wherein a signal ($M_{mot,stat}$), which represents the steady-state engine torque, is applied to adjust said tension.

11. The system of claim 8, wherein a signal ($M_{mot}$) is applied for adjusting said tension; and, said signal ($M_{mot}$) representing the dynamic engine torque.

12. The system of claim 11, further comprising:

means for detecting a signal ($N_{mot}$) representing the rpm of said engine; and, means for determining the time-dependent change ($\dot{N}_{mot}$) of said signal ($N_{mot}$) representing the rpm of said engine for determining said engine torque.

13. The system of claim 12, wherein a quantity ($I_{mot}$) represents the inertia of said engine; and, said quantity ($I_{mot}$) is applied to determine said engine torque.

14. The system of claim 8, wherein said tension is provided by charging at least one pressure chamber with pressure.

* * * * *

UNITED STATES PATENT AND TRADEMARK OFFICE
CERTIFICATE OF CORRECTION

PATENT NO. : 6,050,913 Page 1 of 1
DATED : April 18, 2000
INVENTOR(S) : Lutz Reuschenbach, Karl-Heinz Senger, Joachim Luh, Johann Luyckx and Rine Pelders It is certified that error appears in the above-identified patent and that said Letters Patent is hereby corrected as shown below:

Column 5,
Line 62: delete "$123_c$" and substitute -- $123_c$ -- therfor.

Column 7,
Line 10: delete " ($N_{mot}$) "and substitute -- ($N_{mot}$) -- therefor.

Column 8,
Line 21: delete "($N_{mot}$) " and substitute -- ($N_{mot}$) -- therefor.

Signed and Sealed this

Twenty-eighth Day of August, 2001

*Attest:*

NICHOLAS P. GODICI
*Attesting Officer*     *Acting Director of the United States Patent and Trademark Office*